Nov. 2, 1937.  A. W. MALL  2,097,729
PORTABLE POWER MACHINE
Filed Jan. 9, 1935   2 Sheets-Sheet 1

Inventor
Arthur W. Mall,
By Morence B. Rey
Attorney

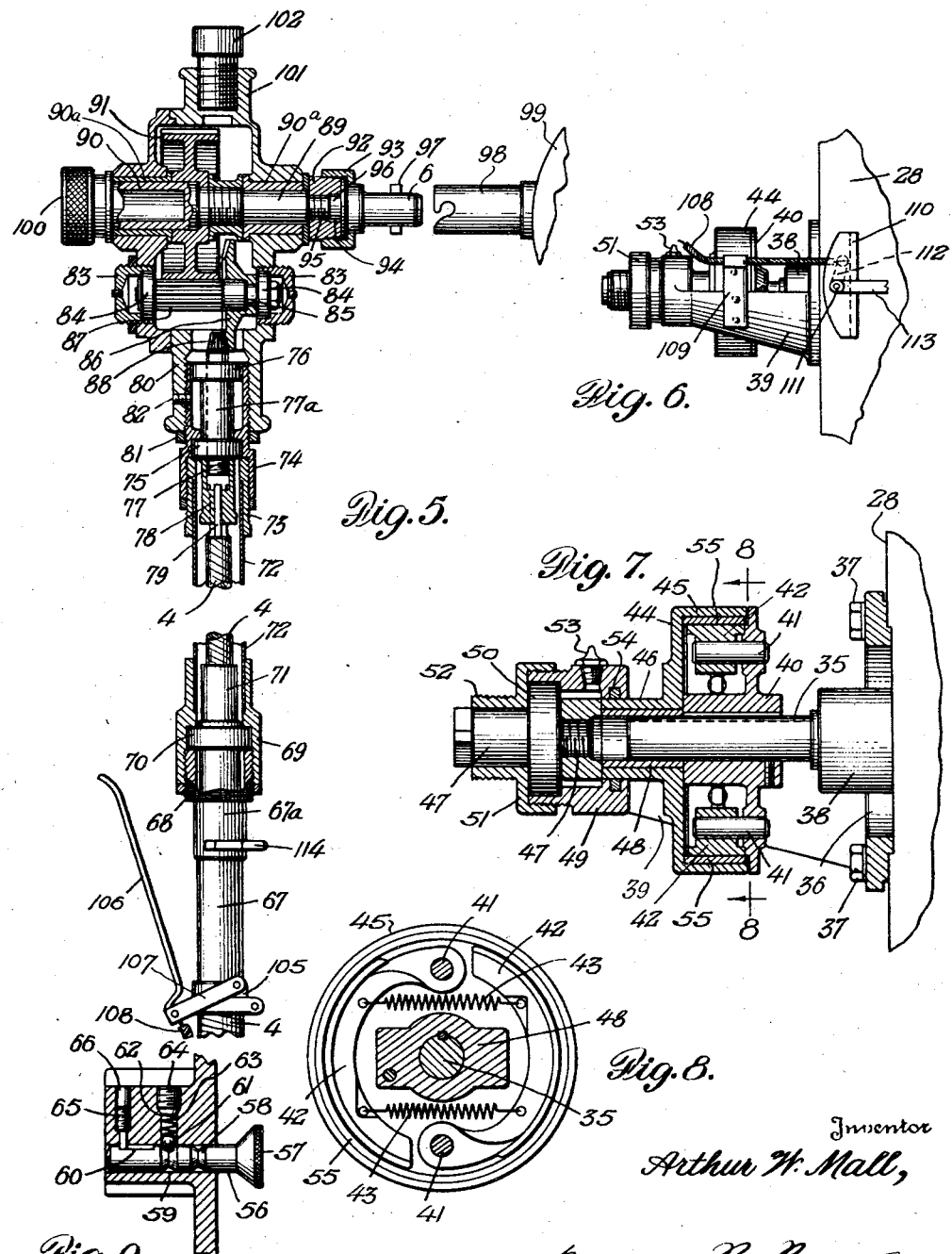

Patented Nov. 2, 1937

2,097,729

UNITED STATES PATENT OFFICE 2,097,729

PORTABLE POWER MACHINE

Arthur W. Mall, Chicago, Ill.

Application January 9, 1935, Serial No. 1,077

7 Claims. (Cl. 123—179)

My invention relates to portable power machines and more particularly has reference to a machine which may be employed to drive a rotatable shaft.

As one example of the employment of my portable power machine, it may be utilized to energize an inertia starter, which device is now provided as standard equipment on airplanes for starting the motor or motors of the plane. An inertia starter includes a fly wheel which is connected through a complicated and delicate system of gears to a drive shaft adapted to be manually or automatically moved into driving engagement with the motor crank shaft so as to crank the motor. In order for the starter to perform its function, it is necessary to energize it or to rotate its fly wheel at a high velocity. To accomplish this, manual or power driven means, both of which possess certain disadvantages, are employed. The manual means is of course a hand crank while the power driven means commercially used at the present is an electric motor.

The disadvantages of hand cranking resides in the fact that in cold weather, due to the hardening of the grease and the thickening of the oil in the starter, it is impossible to manually turn these devices up to the necessary speed. Even in warm weather it requires a very strong man to cause their actuation.

Where an electric starter is used it is either installed in the airplane and driven by a storage battery, which latter is quickly run down or discharged, or the electric motor energizing device is mounted on a portable gasoline motor generator set and is so constructed that its drive shaft may be detachably connected to means on the inertia starter for causing rotation of the fly wheel. No matter what type of electric motor is used nor no matter how the motor is wound, the very serious disadvantage is always present in that the starting torque and speed of the motor is so high as to cause considerable impact shock and strain on the gears and other parts of the inertia starter when the energizing operation is begun. As a result these parts are subjected to considerable chance of breakage. This condition still exists even where reduction gearing between the electric motor and the driving connection of the energizing device is employed since a friction release located in a position after the reduction gearing and adapted to engage the driving connection is now the present practice, with the result that when the driving connection is engaged, the gearing has a high torque and the impact shock on the inertia starter is still present. Moreover, where the last mentioned means are employed with a hand electric starter working from a motor generator set, the starter is formed into a cumbersome and unwieldly device which is difficult to operate.

Obviously motor generator sets, which are usually mounted on a light truck or auto, possess the disadvantage of duplication of parts which requires a separate gasoline motor to run a generator which in turn runs the electric motor used to energize the starter.

It is hence the major object of my invention to provide a power machine for driving a rotatable shaft, which machine lacks the disadvantages inherent in devices heretofore used by the prior art.

An equally important object of my invention is to provide a power machine which is designed, though not necessarily so, to energize an inertia starter, means being associated with the same for driving a stub shaft capable of connecting to the starter so that said shaft on its initial rotation or starting will develop substantially zero torque, this torque being gradually and constantly raised as the power source is speeded up.

Another object of my invention is the provision of a power machine which is readily movable from one point to another and is so constructed that it may be knocked down and dismantled in order that it may be packed in small places.

Yet another object of my invention is to construct an outside power device wherein an internal combustion motor is employed as the prime mover for the device.

Still another object of the invention is the provision of a novel friction clutch which is associated with a gasoline engine and is employed to drive a power take off shaft.

Yet still another object of the invention is the association with a carriage having a gasoline motor mounted thereon, the motor being provided with a drive mechanism, of remote control means for varying the speed of the engine and hence the torque of the motor and the drive mechanism.

A further object of my invention is to provide a novel drive shaft coupled with a reduction gearing mechanism, the same being adapted to be connected to the power source.

A still further object of the invention is to combine with a gasoline motor, a flexible shaft adapted to drive a reduction gearing mechanism and drive shaft, the flexible shaft being connected to an automatic friction clutch driven by the motor, means being also provided for varying the speed of the motor and hence the torque produced throughout the entire drive.

Yet a further object of the invention is to provide a gear reduction mechanism, adapted to be used with a power machine, of such design that its drive shaft may be driven either right or left handed.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit of the invention and the scope of the claims appended hereto.

Briefly the invention comprehends a portable power machine and discloses as one manner of effectively comprehending the same, a portable carriage, either with or without a pneumatic wheel mounting, having secured thereto a gasoline engine which is adapted to drive through a novel automatic slip clutch and a flexible shaft, a reduction gear mechanism provided with a drive shaft which drives a separate device or mechanism. In combination with the friction slip clutch, which is connected to the drive shaft of the motor, the invention comprehends a remote control for varying the speed of the motor so that the torque produced by the finally driven shaft of the reduction gear mechanism may be slowly raised from zero, or substantially so, to the maximum torque that the machine will produce. Further the invention includes novel means for allowing the final drive shaft to be driven either left or right handed. In addition the invention comprehends an outside power device which is of small size and relatively light weight and also is so constructed that it may be readily disassembled so as to be packed in small places for transportation purposes.

In order to make my invention more clearly understood, I have shown in the accompanying drawings, means for carrying the same into practical effect without limiting the improvements in their useful applications to the particular constructions which for the purpose of explanation, have been made the subject of illustration.

In the drawings:

Figure 5 shows a broken away view in partial section of the reduction gear spindle, the driving connection for the machine being energized by the device of this invention and the remote control means employed to vary the speed of the motor.

Figure 6 is a side elevation of the clutch driven by the prime mover.

Figure 7 is a view similar to Figure 6 but shows in detailed section the clutch construction.

Figure 8 is a section through the clutch taken on the line 8—8 of Figure 7.

Figure 9 is a detail of a lock employed with the clutch.

Throughout the drawings similar reference numerals refer to like parts.

Figure 1:
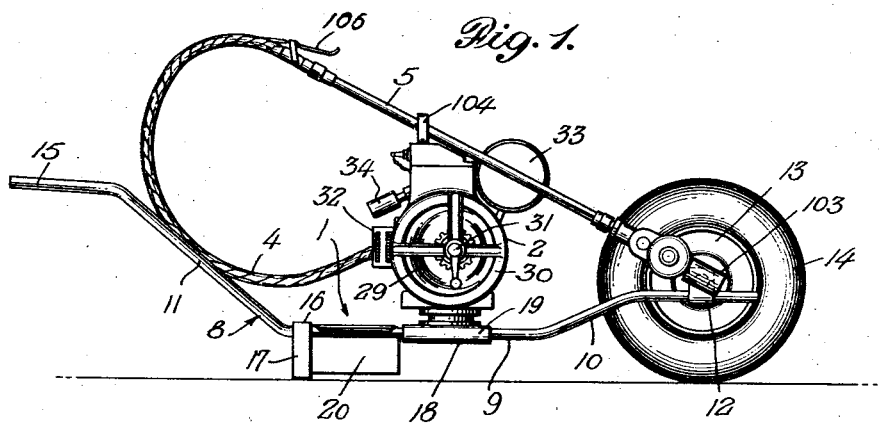
Figure 1 is a side elevation of one form of the invention.
Figures 2, 4:
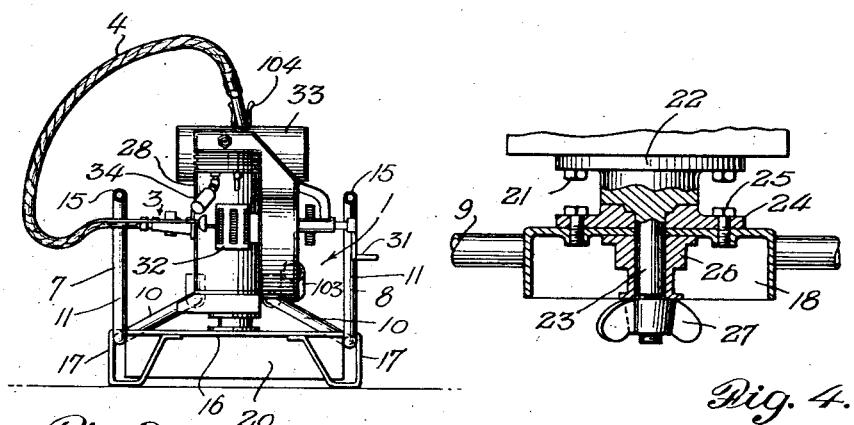
Figure 2 is an end elevation of the device of Figure 1.
Figure 4 is a detailed partial sectional elevation of the means employed for mounting the prime mover on the carriages shown in Figures 1 through 3.

In Figures 1 and 2 there is shown one form of the device wherein a mono cycle carriage is employed as a mounting for a prime mover 2, the latter being disclosed as an internal combustion engine. Engine 2 is so mounted on the carriage 5 as to be freely rotatable about a vertical axis, which swivel construction will be later described. Driven by the motor 2 is a friction clutch 3 which is connected to a flexible drive shaft 4 adapted to drive through a reduction gearing mechanism 5 a driving shaft 6 which is provided with means for starting a separate power unit, the latter being for example another internal combustion engine, or some starting device for the same.

The carriage 1 consists of tubular members 7 and 8, each having the horizontal portion 9 and the bent up extensions 10 and 11, the extensions 10 being connected to a bearing 12 adapted to support an axle on which is mounted the wheel 13 having thereon a low pressure balloon tire 14. Extensions 11 are formed into handles 15 so that the device may be pushed or pulled over the ground. As may be noted in Figure 2 the tubular members 7 and 8 are held in fixed spaced apart relation by means of a tie plate or cross member 16, the same being provided with downward extensions which are formed into legs or supports 17 which support the machine in conjunction with the tire and wheel when the apparatus is at rest on the ground. The cross piece 16 is secured to the tubular members 7 and 8 in any suitable manner as for example by welding. To be noted is the fact that by the construction expedient just described a substantially rectangular base portion is formed on the carriage between the ends of the horizontal portions 9 upon which may be secured a motor mounting plate 18, the latter being provided with sides 19 which engage the tubular members with a sliding friction fit or which may be permanently secured to the same as by welding. In addition the cross plate 16 is so constructed that a tool tray 20 may be formed integrally therewith or may be separately secured thereto as may be desired.

The construction of the carriage as just described allows the motor to be mounted thereon so that it may be rotated about a vertical axis through 360 arcuate degrees. This permits the machine to be quickly and readily operated, even in small spaces, since without refined adjustment of the position of the carriage supporting the motor and the power take off mechanism, the latter may be readily connected to the device to be driven. In order to accomplish this the base of the motor has attached thereto, by means of bolts 21, a swivel plate 22 which is formed with a king pin or swivel bolt 23. This latter extends, as may be observed in Figure 4, through a support or filler plate 24 secured to the engine support plate 18 in any suitable manner, as for example by the bolts 25. The swivel bolt 23 also extends through a bushing or bearing 26 secured to the bottom of the engine support plate 18 as well as through the latter. This construction allows the motor to be rotated and for the purpose of securing the motor on the carriage a wing nut 27 engaging threads on the end of the swivel bolt is employed.

The prime mover disclosed for this outside power machine has been shown as a one cylinder air cooled internal combustion motor of conventional type and it has been found that such a motor capable of developing two horse power and a maximum speed of about 4000 R. P. M. works very satisfactorily. Of course a motor possessing either a greater or lesser horse power and speed may be employed if desired. As shown the motor consists of the cylinder 28, fly wheel 29 encircled by the housing 30 which permanently supports a geared hand crank 31 employed for starting the motor. The motor is supplied with a suitable fly wheel magneto, mechanical governor and a carburetor (which to simplify the drawings have not been shown) and also a gasoline strainer 32, gas tank 33 and exhaust 34.

For the purpose of driving the drive shaft associated with the reduction gear mechanism, the prime mover 2 is provided with an automatic friction slip clutch which positively engages the drive for the power take off means, but only effects such engagement at predetermined engine speeds while at starting and idling speeds the power take off drive is not engaged, such engagement being gradually effected due to the slipping action of the clutch as the motor is speeded up with the consequent result that the speed of the take off mechanism and also the torque developed thereby is slowly brought up to full load. This clutch, which is shown in detail in Figures 6 through 9, is connected to the drive shaft 35 of the prime mover 2. A clutch bracket 36, secured by bolts 37 to the cylinder wall supports a bearing 38 for the motor drive shaft and also a clutch casing or covering 39. Drive shaft 35 has keyed thereto a clutch hub 40, which latter has pins 41 secured to the face thereof, friction shoes 42 being mounted on the pins. These friction shoes due to their construction and mounting will be thrown outwardly, as shown in Figure 8, as the result of centrifugal force on the actuation of the motor and the consequent rotation of the clutch hub, the quickness and extent of the friction shoe movement being limited as desired by the springs 43.

As the driven member of the clutch, there is disclosed a clutch housing 44 provided with a hub or drum 45 which encircles the friction shoes and is adapted to be frictionally engaged by them, the engagement pressure exerted by the shoes being of course determined by the speed of the engine drive shaft. To support the clutch housing this member is provided with an extension 46, the outer end of which is internally threaded and is engaged by the externally threaded stub shaft 47, while the inner end of the housing is provided with an internal bushing 48.

The bushing 48 fits over the end of the engine drive shaft 35 and allows the shaft to turn freely therein. Stub shaft 47 extends through the bearing support 49, carried by the casing 39, and the ball bearing 50. The end of the stub shaft is enlarged and is internally threaded to receive a coupling member attached to the flexible drive shaft 4 which causes the actuation of the reduction gear spindle and its associated drive. For the purpose of holding the ball bearing 50 within its seat, the outside of the bearing support is threaded to receive a fastening member or adapter 51 provided with the external threads 52 which are engaged by a coupling member of conventional form connected to the flexible drive shaft covering so that this shaft and covering may be securely connected to the clutch. Bearing support 49 is provided with a suitable grease fitting 53 and felt washer 54, the latter adapted to prevent grease seepage from the bearing.

To facilitate the frictional engagement of the shoes with the hub of the clutch housing, the latter is provided with a friction brake lining 55, although if desired the same may be secured to the shoes 42. From the showing of the device as so far described, it is obvious that on the starting of the motor and while the same is idling the clutch housing and its shaft 47 will not be driven. However, as the motor is speeded up the brake shoes 42 are thrown outwardly, due to centrifugal force, and engage the hub of the clutch housing so that the same is driven. The initial engagement of the shoes provides a slipping engagement between them and the clutch housing, which as the speed of the motor is increased gradually reaches a positive engagement so that the clutch housing is rotating at a speed equal to that of the motor drive shaft. On a further increase of motor speed the clutch housing and its stub shaft 47 are equally speeded up while on the slowing down of the motor, the process just described is reversed.

If desired instead of the automatic friction drive for the clutch housing, a positive drive which engages the housing to the hub may be employed. Such a drive consists of the locking pin 56 provided with the knurled head 57, the locking pin being shown in detail in Figure 9. This locking pin 56 is mounted within a recess formed within the hub of the clutch and is adapted to engage the latter to the clutch housing which is provided with a corresponding recess adapted to receive the locking pin. Lock member 56, which is of a cylindrical shape, is formed with locking grooves 58 and 59 and with a guide groove 60. The former are used in conjunction with a spring pressed ball 61 placed within a recess 62 formed within the clutch hub and held against the engaged locking groove by reason of the spring 63 mounted within the recess and held therein by reason of the set screw 64. Also provided within the clutch hub is another recess 65, the same having a pin member 66 threaded therein, the pin of the member engaging the guide groove 60 so as to prevent rotation of the lock 56. In the position shown in Figure 9 the locking member 56 is out of engagement with the clutch housing. However, on pushing the member 56 inwardly, as viewed in Figure 9, it is engaged to clutch housing 44 so that the latter rotates with the clutch hub, the lock member being held in position by reason of the engagement of the ball 61 with the locking groove 58. Obviously since the sides of the grooves 58 and 59 are beveled, it may be appreciated that the locking pin or member 56 may be manually moved into and out of engagement with the clutch housing. The mechanism just described provides a means for locking the driving and the driven members of the clutch together, which means if desired may be employed instead of the automatic friction drive for the clutch housing.

As already described the driven shaft 47 of the clutch has connected thereto a flexible shaft 4 which may be made of piano wire, wound solid to center to an outside diameter of about one half an inch and which may be covered with a weatherproof housing of rubber and canvas, the housing being lined with a steel coiled bearing for the shaft itself. The end of the shaft 4 is provided with a conventional coupling member adapted to be secured to the end of the shaft 47 and a fitting connected to the flexible shaft housing and adapted to be secured to the adapter 51. For the sake of simplifying the drawings, the coupling and fitting last mentioned have not been shown.

As already pointed out, the flexible shaft 4 is connected to a reduction gear mechanism which drives the driving shaft 6. The flexible drive shaft, which is usually of a seven foot length, although if desired it may be made longer, passes into the housing of the mechanism 5 and is connected to a shaft 77 supported within the housing and employed for rotating the gearing therein. The housing of the mechanism 5 is between three and four feet long, although as in the case of the flexible shaft it may be either longer or shorter, and consists of the tubular member 67 to which is engaged the member 67a, which latter is provided with an adapter 68 onto which is screwed the bearing support 69. Within the bearing support 69 is mounted a ball bearing 70 for the flexible drive shaft, there also being an extension 71 formed on the member 67a which assists in supporting the flexible shaft. In addition the mechanism 5 includes the tubular member 72, one end of which is engaged to the bearing support 69 and the other end of which is secured to a coupling member 73 carried by another bearing support 74, the latter housing ball bearings 75 and 76 for the shaft gear 77. To the threaded end of the gear shaft 77 is engaged a coupling member 78, to which is connected, by means of the spline 79, the flexible shaft 4. Between the bearings 75 and 76 is a bushing 77a around the shaft 77. Bushing 77a assists in holding the bearings 75 and 76 in their seats.

The support 74 is internally screw threaded at one end so that it may be engaged by the coupling member 73, while at its other end, the bearing support is externally screw threaded and is engaged by the reduction gear housing 80. A collar 81 is provided on the bearing support to facilitate the connecting of the support with the other parts associated therewith and also a set screw 82 is provided in the wall of the gear housing 80 in order to hold the bearing support in firm connection therewith.

The gear housing 80 has bearing supports 83 threaded therein, the same being adapted to carry the ball bearings 84 provided on the shaft 85 for its support. Shaft 85 has fixedly secured thereto a bevel gear 86 and spur gear 87, the former being driven by the gear 88 on the end of the shaft 77. To drive the stub shaft 6 the upper part of the gear housing, as seen in Figure 5, has mounted therein a shaft 89 at right angles to the shaft 77 driven by the shaft 4 connected to the clutch. Shaft 89 is formed with an enlargement into which is screwed a shaft 90, both shafts 89 and 90 being supported in bearings 90a carried within the gear housing. Secured to the shaft 90 is a gear 91 which meshes with the gear 87 on the shaft 85.

Shafts 89 and 90 are enlarged on both sides of the gear housing, as indicated by the enlargement 92 for the shaft 89. Each enlarged portion is externally screw threaded and is adapted to be engaged by the coupling member 93 which encircles and carries the stub shaft 6 or is engaged by the closure cap 100. As may be noted each enlarged portion 92 is formed with a channel 94 and is internally threaded as indicated at 95, being adapted to respectively receive the enlargement 96 on the shaft 6 and the threaded end of the shaft. Drive shaft 6 is also provided with pins 97 adapted to engage a bayonet jointed hollow shaft 98 connected to the device 99 to be driven by the power machine so far described.

As already pointed out, the ends of the shafts 89 and 90, outside of the gear housing, are formed with a similar construction. This permits the coupling 93 and shaft 6 to be connected to either the right or left side of the reduction gear mechanism with the obvious result that the shaft 6 may be driven either right or left handed, as desired, depending on which side or to which shaft 89 or 90 the coupling 93 is secured. To keep out dust, a cap 100 already mentioned, is provided to cover the side of the drive shaft 6 which is not connected to the driven shaft 98.

The gear housing is extended above the shaft 89 and shaft 90 so as to form a recess for the gear 91 and also a means for allowing the gears within the housing to be lubricated. This latter consists of the extension 101 which is threaded to receive the plug 102 which may be readily removed in order that the mechanism in the housing may be properly lubricated.

A cup 103, mounted on the wheel bearing, and a clip 104 secured to the motor afford means for supporting the spindle 5 and flexible shaft 4 when the machine is not in operation. These means are clearly shown in Figure 1 wherein the machine is shown ready for transportation over the ground.

The member 67 of the spindle has a collar 105 secured thereto at the end of the reduction gear housing adjacent the flexible shaft. This collar, which affords a means for securing the covering of the flexible shaft to the housing, has an arm 107 pivoted thereto, to which is connected a hand lever 106. Hand lever 106, which is pivoted to the collar 105, is secured to a cable or Bowden wire 108 which is provided with a suitable weather proof covering. By any suitable means the cable 108 is held adjacent to the flexible shaft in order to prevent it obstructing the operation of the machine.

Cable 108 runs from the control lever 106 through the guide 109 mounted on the clutch covering and has its end secured to a link 112 pivoted on the shaft 11 carried by the throttle plate 110 which is secured to the cylinder of the motor. The other end of the link 112 is connected to an arm 113 adapted to control the adjusting spring of a conventional mechanical governor, the latter not being shown in the drawings. The mechanical governor is in turn connected to the carburetor so that the amount of fuel fed to the motor may be regulated. In this manner the speed of the motor may be varied at will on the manipulation of the hand throttle, it being possible through the means disclosed to gradually and evenly increase or decrease the motor speed.

For the purpose of explaining the operation of the machine heretofore described, the manner in which it may be employed to energize an inertia starter on an airplane, will be illustrated.

In Figure 1, the machine is ready for movement to a work position, as for example from a hangar to a location adjacent an airplane on a flying field. As shown, the flexible shaft 4 and spindle 5 are held in position by reason of the clip 104 and the cup 103. To move the machine, a single operator grasps the handles 18 and either pushes or pulls the device, in wheel barrow fashion, roughly adjacent to the device to be energized. Since the carriage is underslung and has a low center of gravity, it is evident that a firm support is provided for the machine when at rest and also that the vibrations of the operating motor will not tip over the device.

The machine being roughly positioned adjacent to the device to be started or energized, the motor 2 is cranked by means of the hand crank 31 so as to cause its actuation. Since on starting and idling speeds the flexible shaft is not engaged to the clutch, it is unnecessary to remove the gear housing from its transportation and rest position shown in Figure 1. After the motor 2 is operating the housing is lifted from the machine and the drive shaft 6 with its engaging pins 97 is inserted in the bayonet joint of the coupling shaft 98, which latter is adapted to drive the inertia starter or other device of motor 99. As is well known, the outside connection for driving an inertia starter on an airplane is some feet off of the ground. Due to the length of the flexible shaft 4 and the reduction gear mechanism 5 it will be appreciated that this may be easily reached. Also since the motor 2 is mounted on a swivel, the machine may be roughly placed with respect to the aircraft to be started, thus affording a considerable saving in starting time and lost effort in positioning the machine.

For the purpose of inserting the drive shaft 6 within the bayonet jointed coupling 98, the operator grasps the gear housing in both hands in such a manner that the fingers or a thumb of one hand engage the control lever 106, while the other hand holds the upper part thereof. In this manner the housing and the flexible shaft attached thereto may be removed from its support on the motor and the housing may be raised or otherwise shifted so as to engage a coupling on a shaft which is to be driven.

The motor 2 having been started and the drive shaft having been engaged with the coupling 98, the operator presses on the control lever so as to move the cable 108 and increase the speed of the motor. As the hand lever 106 is slowly depressed the motor is slowly and gradually speeded up with the result that the shoes 42 are thrown outwardly, due to centrifugal force, and at first grip the clutch housing in a slipping engagement. This results in a slow driving of the flexible shaft and also of the shaft 6. On the increase of the motor speed, the shoes gradually increase their gripping action until the clutch housing is positively engaged by them and the flexible shaft is rotating at a speed equal to that of the motor shaft 35. On a further depression of the hand lever 106, the motor, flexible shaft and drive shaft are slowly brought up to their maximum speed and also their maximum torque. When the inertia starter or other device has been rotated at a speed and for a time sufficient to store enough energy in the device to crank the airplane motor, the motor 2 is slowed down slightly so that the operator on pulling outwardly on the mechanism 5 may release the drive shaft from its engagement with the coupling member 98. The inertia starter being now up to speed, may be connected with the airplane motor so as to crank the latter.

My machine having been successfully employed, it may be rolled to another airplane and the same starting process gone through with. Thus it will be realized that my machine may be employed for starting a squadron of airplanes and that this may be accomplished by a single operator for the machine. After starting a plane or planes, the machine may be returned to its storage position or it may be dismantled and packed in an airplane for transportation.

When the airplane carrying the starting machine arrives at its destination, the machine is unloaded and assembled so that it may be used for starting the airplane or the squadron of airplanes when the particular plane or squadron is ready for flight. The advantage of this device becomes obvious when it is considered that it is so constructed that it may be readily transported and that it may be the means for starting one or more airplanes. Another advantage resides in the fact that the machine shown in Figures 1 and 2 is of a relatively light weight, weighing only 165 pounds, so that there is no heavy increase of the load carried by the airplane which transports the machine.

To dismantle or disassemble the machine, the flexible shaft 4 has its couplings unscrewed from the shaft 47 and adapter 51. After this the member 73 is disengaged from the member 74. This permits the flexible shaft and the lower part of the spindle 5 to be separated from the motor and from the upper part of the spindle which carries the gear housing and the power take off shaft 6. The wing nut 27 is then removed from the end of the motor spindle 23 and the motor is then lifted off its carriage. Thus the machine may be readily knocked down for transportation and it will be realized that this procedure may be reversed with equal speed and facility so that the machine may be assembled for operating purposes.

I have found that with a two horse power motor a reduction gearing, such as that shown and composed of one bevel gear reduction and one spur gear reduction, works very satisfactorily, the actual reduction being in thirty to one ratio. With such gearing when the motor is working at full speed and under full load approximately 150 foot pounds of torque are transmitted by the coupling 98.

One extremely important feature of the invention resides in the fact that the control cable is connected to the automatic governor which in turn actuates the motor carburetor. The operation of the cable regulates the governor setting and hence the quantity of fuel injected into the motor at any one instant, an attendant regulation of the motor speed being attained. This expedient gives a smoothness of control permitting a gradual and smooth increase of motor speed which is not attainable if the carburetor were directly actuated from the control lever 106. As is well known the average human hand is not very sensitive so that if the control cable operated by the hand lever 106 were directly connected to the carburetor, the increase and decrease in the motor speed would not be gradual and smooth on the depression of the hand lever, but would be sudden and jerky. It is desired to eliminate such operation and it is for this reason that the mechanical governor is employed. In addition the housing has a hand rest 114 which is adapted to assist the operator in slowly and gradually depressing and releasing the hand lever 106. Suitable springs may be connected to the hand lever and to the link 112 so that the remote control is normally maintained in a position which allows the motor to run at idling speed.

Along with the control of the motor speed through a mechanical governor it should be noted that the shaft 6 is not rotating on its engagement with the coupling 98 and that as the motor speed is increased the shaft begins to turn slowly and on increasing the motor speed to its maximum the shaft is raised to its highest speed and torque. It will thus be appreciated that the initial torque of the drive shaft 6 due to its initial rotation is substantially zero and that this torque is raised to a maximum on increasing the motor speed. Such action is desired since the device 99 will be started smoothly and with a lack of sudden shock or jar on the gears or other parts of the mechanism being driven.

In this respect the action of my machine may well be likened to the hand cranking of the starter or other mechanism 99. This analogy is obvious when it is considered that on the first rotation of a hand crank, substantially zero torque is developed to rotate the coupling 98 but as this hand cranking is continued the speed and also the torque applied to the shaft coupling will increase with the result that the latter and hence the device 99 is rotated faster and faster. However, it should be noted that this bringing of the member 98 up to its maximum speed obtainable by hand cranking is a gradual process and is one in which the torque to turn the same is gradually and not suddenly applied so that the device 99 is actuated at an even increasing acceleration and no shocks are imparted to it due to sudden increases in speed and torque of the driving connection. While the actuation of my machine has just been stated to be similar to hand cranking of the device 99 it will be well understood that the driving connection for the device to be actuated may be turned much faster, due to the power of the motor and also due to the reduction gearing, than is possible by manual manipulation of a crank.

Another feature of the machine resides in the fact that the drive shaft 6 may be driven either right or left handed. From an inspection of Figure 5 it may be observed that while the shafts 89 and 90 are driven in the same direction connection with one or the other will give a drive in opposite directions, and also that the shaft 6 and its coupling 93 may be quickly detached from the enlarged end of either shaft 89 or 90 and may be coupled to the opposite shaft. Through such means the mechanism may be transformed quickly and easily so as to provide either a right or left hand drive for the shaft 6.

Figure 3:
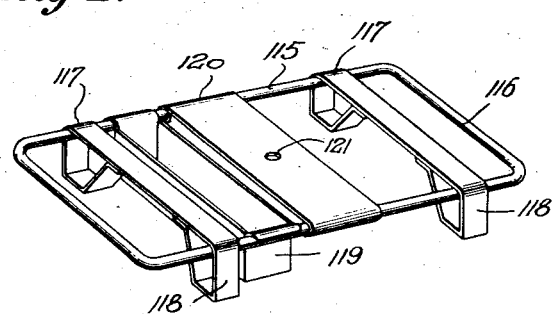
Figure 3 shows another form of carriage mounting for the machine shown in Figure 1.

If desired the automatic action of the clutch may be dispensed with and the shaft 6 may be continuously and positively driven. This is accomplished by pushing inwardly on the locking pin 56 so that it engages the clutch housing and secures this part of the clutch to the clutch hub. To release the locked parts of the clutch, the pin 56 is pulled outwardly.

Where a lighter machine is desired, one having a weight of about 115 pounds may be constructed by using the motor mounting shown in Figure 3. This mounting consists of the rectangular frame having side pieces 115 and end pieces 116, these members being formed of metal tubing. The sides 115 are strengthened by cross ties 117, the ends of the latter being bent downwardly, thence horizontally and thence upwardly and are secured to the under surface of the cross ties. In this manner ground supports 118 are provided for the motor mounting. Cross ties 117 may be secured to the frame by any suitable means, as for example by welding. In addition a tool tray 119 is similarly secured to the motor mounting frame.

To mount the motor 2, a plate 120 is welded or otherwise secured to the side members of the motor support frame. This plate is provided with an opening 121 through which the end of the motor spindle 23 is adapted to extend. The motor is secured to the plate 120 by a wing nut 27 in a manner like that already described in connection with Figures 1, 2, and 4.

The motor, clutch, flexible shaft, reduction gear mechanism and drive shaft employed with the mounting shown in Figure 3, are in all respects identical to those devices described in connection with the preceding figures of the drawings. In carrying the same the reduction gear mechanism may be placed along the carriage adjacent to the motor during carrying, or the motor may be provided with a clip 104 and a cup, similar to the cup 103, may be secured to the motor mount. Through the last mentioned means, the reduction gear housing and flexible shaft may be supported in non-working position in a manner like that disclosed in conection with Figure 1.

While I have disclosed the operation of the machine in connection with the energizing of a starting device for a motor it will be realized that my machine may be utilized to start a motor directly. This may be accomplished by merely connecting drive shaft 6 to the crank shaft connection or other means for rotating the motor to be started. Further it will be realized that my machine need not be used solely to start a motor, but may be employed to drive any rotatable shaft on any type of mechanism.

For example the power machine may be employed for actuating devices used for the purpose of nut setting, drilling, screwing and driving.

Whether the power machine is used for one of the above mentioned purposes or for energizing an inertia starter, a very important fact resides in the slipping of the clutch when the torque load on the drive shaft 6 and the gear mechanism becomes great enough to normally break the flexible shaft and stall the motor of the power machine. To overcome this the slipping action of the clutch is again utilized. Under conditions such as those just described the power source merely slows down and due to the slipping of the clutch continues operation without breakage to the power machine and its parts or to the device being driven by the power machine. Moreover, the flexible shaft aids in preventing shocks to the power machine and the mechanism driven thereby when this situation occurs. This feature of the power machine clutch, which clutch might be termed double acting inasmuch as it slips until the power source 2 is brought up to a predetermined speed and also slips if the torque load becomes too great, permits the power machine to remain connected to an inertia starter even when the clutch of the inertia starter is connected to a motor crank shaft and where the power source of the power machine does not develop sufficient power to turn the crank shaft of the engine being energized. Of course the importance and advantage of this expedient is obvious when considered in connection with such similar operations, for example, as driving, screwing, nut setting and drilling.

In summation it will be appreciated that I have devised a power machine of simplified design in which a power source through a novel automatic clutch and a flexible shaft is connected to a gear reduction mechanism having a drive shaft adapted to drive many and varied types of mechanism, the power machine being of a portable nature.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A power machine comprising a carriage having a power source mounted thereon, means for connecting said power source to a flexible drive shaft so that the flexible drive shaft may have its rotational speed slowly and evenly increased from zero at idling speed of the power source to a maximum on the raising of the power source to its maximum speed, a reduction gear housing having a system of reduction gearing, a stub shaft having a clutch element at its free end, said shaft supported by the housing and driven by said gearing system, said gearing system being operatively connected to said flexible shaft so that it may be driven thereby, a rigid handle on said housing, and means on said handle connected to said power source for slowly and evenly varying the speed developed by the power source.

2. A power machine comprising a carriage having a power source mounted thereon, a friction slip clutch consisting of a driving member and a driven member, the former being connected to said power source, means for rotating the driven member of the clutch only at speeds in excess of the idling speed of the power source, said means being such that the speed of rotation of the driven member is gradually and evenly raised from zero to a rotational speed equal to that of the driving member of said clutch, a reduction gear housing containing a system of reduction gearing, a stub shaft having a clutch element at its free end driven thereby, said shaft supported by the housing and driven by said gearing system, said gearing system being operatively connected to a flexible drive shaft secured to said driven clutch member, a rigid handle on said housing, and means on said handle connected to said power source for slowly and evenly varying the speed developed by the power source.

3. A power machine comprising a carriage having a power source mounted thereon, means for connecting said power source to a flexible drive shaft so that the flexible drive shaft may have its rotational speed slowly and evenly increased from zero at idling speed of the power source to a maximum on the raising of the power source to its maximum speed, a reduction gear housing having a system of reduction gearing, a stub shaft having a work engaging end, said shaft supported by the housing and driven by the gearing system, detachable means for connecting said stub shaft to said gearing so that said shaft may be driven in a clock or in a counterclockwise direction, said gearing system being operatively connected to said flexible shaft so that it may be driven thereby, a rigid handle on said housing, and means on said handle connected to said power source for slowly and evenly varying the speed developed by the power source.

4. A power machine comprising a carriage having a power source mounted thereon, a flexible drive shaft associated therewith, means for connecting said power source to said flexible drive shaft so arranged that the flexible drive shaft may have its rotational speed slowly and evenly increased from zero at idling speed of the power source to a maximum on the raising of the power source to its maximum speed, a reduction gear housing of tubular construction and of a length allowing manual manipulation, a handle thereon, said housing including a system of reduction gearing, said reduction gearing including a drive shaft, a stub shaft having a clutch element at its free end, means for detachably connecting the stub shaft to said drive shaft so that said stub shaft may be rotated in a clock or counterclockwise direction, means connecting said reduction gearing to said flexible shaft, a speed governor for said power source, and a manually operated lever mounted on the handle portion of said tubular housing for actuating said speed governor for slowly and evenly varying the speed developed by the power source, said lever being operatively connected to said speed governor.

5. A unitary starter assembly comprising in combination, an internal combustion engine with a drive shaft, engaging means arranged for connection to a mechanism to be started, means connecting said engaging means with said drive shaft to be driven thereby, including a clutch arranged to establish and gradually increase its connecting effect as the engine speed increases above idling speed, and a speed control for said engine associated with the second said means.

6. A unitary starter assembly comprising in combination, a portable carriage, an internal combustion engine thereon including a drive shaft, a flexible shaft, a slip clutch between said shafts, operable to establish and gradually increase a connection between said shafts when the engine rises above idling speed, handle means associated with said flexible shaft, a coupling shaft driven by said flexible shaft, and an engine speed control on said handle means.

7. A unitary starter assembly comprising in combination, a portable carriage, an internal combustion engine thereon including a drive shaft, a flexible shaft, a slip clutch between said shafts, operable to establish and gradually increase a connection between said shafts when the engine rises above idling speed, handle means associated with said flexible shaft, a housing at one end thereof, a reduction gearing in said housing, a pair of shafts driven by said flexible shaft through said reduction gearing, and a coupling member selectively connectible to either one of said pair of shafts whereby a clockwise or counterclockwise drive may be obtained.

ARTHUR W. MALL.